United States Patent
Regau et al.

(10) Patent No.: US 10,165,648 B2
(45) Date of Patent: Dec. 25, 2018

(54) OPTOELECTRONIC CIRCUIT AND METHOD FOR OPERATING AN OPTOELECTRONIC CIRCUIT

(71) Applicants: OSRAM OLED GmbH, Regensburg (DE); OSRAM GmbH, Munich (DE)

(72) Inventors: Kilian Regau, Regensburg (DE); Thomas Ungru, Steinenbronn (DE); Karsten Diekmann, Rattenberg (DE)

(73) Assignee: OSRAM OLED GMBH, Regensburg (DE)

( * ) Notice: Subject to any disclaimer, the term of this patent is extended or adjusted under 35 U.S.C. 154(b) by 0 days.

(21) Appl. No.: 15/527,017

(22) PCT Filed: Oct. 13, 2015

(86) PCT No.: PCT/EP2015/073695
§ 371 (c)(1),
(2) Date: May 16, 2017

(87) PCT Pub. No.: WO2016/078835
PCT Pub. Date: May 26, 2016

(65) Prior Publication Data
US 2017/0325313 A1 Nov. 9, 2017

(30) Foreign Application Priority Data

Nov. 17, 2014 (DE) .......................... 10 2014 223 439

(51) Int. Cl.
*H05B 33/08* (2006.01)

(52) U.S. Cl.
CPC ..... *H05B 33/0896* (2013.01); *H05B 33/0824* (2013.01); *H05B 33/0884* (2013.01)

(58) Field of Classification Search
CPC ............ H05B 33/0896; H05B 33/0824; H05B 33/0884
See application file for complete search history.

(56) References Cited

U.S. PATENT DOCUMENTS

2007/0152909 A1 7/2007 Fukuda et al.
2012/0286753 A1* 11/2012 Zhong ....................... G05F 3/26
                                                                  323/282
(Continued)

FOREIGN PATENT DOCUMENTS

DE 10 2006 024 607 A1 11/2007
DE 10 2007 006 438 A1 8/2008
(Continued)

OTHER PUBLICATIONS

German Search Report based on application No. 10 2014 223 439.5 (8 pages) dated Aug. 7, 2015 (for reference purpose only).
(Continued)

*Primary Examiner* — Christine S Kim
(74) *Attorney, Agent, or Firm* — Viering Jentschura & Partner MBB

(57) ABSTRACT

An optoelectronic circuit includes at least one first and second light emitting diodes; a switch arrangement connected between the first and second diodes and configured to switch over the first and second diodes between series and parallel circuits depending on a predefined ambient parameter; and a current matching circuit for matching the currents through the first and second diodes in case of parallel connection. The current matching circuit includes a current mirror circuit, including first and second current mirror transistors connected via its collector terminal to the first/ second diodes, respectively. The arrangement includes a diode/a switch for connecting the first diode in series with the second diode and is configured to form the series circuit including the first and second diodes while bypassing the current matching circuit so that, in case of series connection, the first transistor is switched in a high-resistance fashion and the second transistor is short-circuited.

11 Claims, 7 Drawing Sheets

(56) References Cited

U.S. PATENT DOCUMENTS

| | | | |
|---|---|---|---|
| 2013/0026925 A1 | 1/2013 | Ven et al. | |
| 2013/0200812 A1* | 8/2013 | Radermacher | H05B 33/0824 |
| | | | 315/186 |
| 2013/0249422 A1* | 9/2013 | Kerstens | H05B 33/0815 |
| | | | 315/193 |
| 2013/0307415 A1* | 11/2013 | Ni | H05B 33/0812 |
| | | | 315/122 |
| 2013/0328491 A1* | 12/2013 | Chou | H05B 37/02 |
| | | | 315/191 |
| 2014/0218953 A1 | 8/2014 | Ungru | |
| 2015/0061499 A1* | 3/2015 | Hattrup | H05B 33/0815 |
| | | | 315/122 |
| 2017/0079103 A1* | 3/2017 | Niles | H05B 33/0827 |

FOREIGN PATENT DOCUMENTS

| | | |
|---|---|---|
| DE | 10 2013 201 766 A1 | 8/2014 |
| EP | 2 900 039 A1 | 7/2015 |
| WO | 2012 095 680 A1 | 7/2012 |
| WO | 2012 156 878 A1 | 11/2012 |

OTHER PUBLICATIONS

International Search Report based on application No. PCT/EP2015/073695 (7 pages+3 pages English translation) dated Jan. 12, 2016 (for reference purpose only).

* cited by examiner

OPTOELECTRONIC CIRCUIT AND METHOD FOR OPERATING AN OPTOELECTRONIC CIRCUIT

RELATED APPLICATIONS

The present application is a national stage entry according to 35 U.S.C. § 371 of PCT application No.: PCT/EP2015/073695 filed on Oct. 13, 2015, which claims priority from German application No.: 10 2014 223 439.5 filed on Nov. 17, 2014, and is incorporated herein by reference in its entirety.

TECHNICAL FIELD

The present disclosure relates to an optoelectronic circuit and to a method for operating an optoelectronic circuit.

An optoelectronic circuit may include for example one, two or more light emitting diode elements. The light emitting diode elements can be for example light emitting diodes (LEDs) and/or organic light emitting diodes (OLEDs) or parts or segments of light emitting diodes (LEDs) and/or organic light emitting diodes (OLEDs).

BACKGROUND

The object of the present disclosure is to provide a particularly efficient, particularly cost-effective optoelectronic circuit and/or an optoelectronic circuit having a particularly long lifetime.

SUMMARY

In accordance with one aspect of the present disclosure, the object is achieved by means of an optoelectronic circuit which includes at least one first light emitting diode, at least one second light emitting diode and a switch arrangement, wherein the switch arrangement is connected between the at least one first light emitting diode in such a way and the at least one second light emitting diode and is configured in such a way that it switches over the first light emitting diode and the second light emitting diode between a series circuit formed by them and a parallel circuit formed by them, depending on a predefined ambient parameter. This makes it possible to provide a very efficient and very cost-effective optoelectronic circuit.

In accordance with one development, the predefined ambient parameter is an ambient parameter that is independent of the optoelectronic circuit. This makes it possible to provide a very efficient and very cost-effective optoelectronic circuit.

In accordance with one development, the predefined ambient parameter is a temperature. This makes it possible to provide a particularly efficient and very cost-effective optoelectronic circuit.

In accordance with one development, the predefined ambient parameter is a temperature-dependent operating voltage and/or a temperature-dependent operating current of the at least one first light emitting diode or of the at least one second light emitting diode. This makes it possible to provide a particularly efficient and particularly cost-effective optoelectronic circuit.

In accordance with one development, the at least one first light emitting diode and/or the at least one second light emitting diode are/is configured as organic light emitting diodes. This makes it possible to provide a particularly efficient and particularly cost-effective optoelectronic circuit including organic light emitting diodes.

In accordance with one development, the switch arrangement includes at least one ground-referenced switch. This makes it possible to provide a particularly cost-effective and particularly efficient optoelectronic circuit.

In accordance with one development, the at least one first light emitting diode and the at least one second light emitting diode are formed on a common substrate. This makes it possible to provide a particularly efficient and particularly cost-effective optoelectronic circuit.

In accordance with one development, the optoelectronic circuit furthermore includes a current matching circuit for matching the currents through the at least one first light emitting diode and the at least one second light emitting diode. This makes it possible and the at least one second light emitting diode. This makes it possible to provide a particularly efficient and particularly cost-effective optoelectronic circuit having a particularly long lifetime.

In accordance with one development, the current matching circuit includes a current mirror circuit. This makes it possible to provide a particularly efficient and particularly cost-effective optoelectronic circuit having a particularly long lifetime.

In accordance with one development, the switch arrangement is furthermore configured to form the series circuit including the at least one first light emitting diode and the at least one second light emitting diode whilst bypassing the current matching circuit. This makes it possible to provide a particularly efficient and particularly cost-effective optoelectronic circuit having a particularly long lifetime.

In accordance with a further aspect of the present disclosure, the object is achieved by means of an optoelectronic component which includes the optoelectronic circuit, wherein the at least one first light emitting diode and the at least one second light emitting diode include a common carrier and a common covering body, and wherein the switch arrangement is formed between the common carrier and the common covering body. This makes it possible to provide an optoelectronic component including a particularly efficient, particularly cost-effective optoelectronic circuit and/or including an optoelectronic circuit having a particularly long lifetime.

In accordance with one development, the current matching circuit is furthermore formed between the common carrier and the common covering body. This makes it possible to provide an optoelectronic component including a particularly efficient, particularly cost-effective optoelectronic circuit and/or including an optoelectronic circuit having a particularly long lifetime.

In accordance with a further aspect of the present disclosure, the object is achieved by means of a method for operating an optoelectronic circuit. The optoelectronic circuit includes at least one first light emitting diode, at least one second light emitting diode, and a switch arrangement, wherein the switch arrangement is connected between the at least one first light emitting diode and the at least one second light emitting diode in such a way and is configured in such a way that the switch arrangement switches over the first light emitting diode and the second light emitting diode between a series circuit formed by them and a parallel circuit formed by them, depending on a predefined ambient parameter. The method for operating the optoelectronic circuit includes determining a predefined ambient parameter, and connecting the at least one first light emitting diode in parallel or in series with the at least one second light emitting diode depending on the predefined ambient parameter determined. This makes it possible to operate a particularly efficient and particularly cost-effective optoelectronic circuit.

In accordance with one development, determining the predefined ambient parameter includes measuring a temperature and/or measuring a temperature-dependent operating voltage and/or a temperature-dependent operating current of the at least one first light emitting diode or of the at least one second light emitting diode. This makes it possible to operate a particularly efficient optoelectronic circuit.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which.

DETAILED DESCRIPTION

In the following detailed description, reference is made to the accompanying drawings, which form part of this description and show for illustration purposes specific embodiments in which the present disclosure can be implemented. In this regard, direction terminology such as, for instance, "at the top", "at the bottom", "at the front", "at the back", "front", "rear", etc., is used with respect to the orientation of the figure(s) described. Since component parts of embodiments can be positioned in a number of different orientations, the direction terminology serves for illustration and is not restrictive in any way whatsoever. It goes without saying that other embodiments can be used and structural or logical changes can be made, without departing from the scope of protection of the present disclosure. It goes without saying that the features of the various embodiments described herein can be combined with one another, unless specifically indicated otherwise. Therefore, the following detailed description should not be interpreted in a restrictive sense, and the scope of protection of the present disclosure is defined by the appended claims.

In the context of this description, the terms "connected" and "coupled" are used to describe both a direct and an indirect connection and a direct or indirect coupling. In the figures, identical or similar elements are provided with identical reference signs, insofar as this is expedient.

An optoelectronic circuit may include one, two or more light emitting diodes. Optionally, an optoelectronic circuit can also include one, two or more electronic components. An electronic component may include for example an active and/or a passive component. An active electronic component may include for example a driver circuit, an energy source, a computing, control and/or regulating unit and/or a transistor. A passive electronic component may include for example a capacitor, a resistor, a diode or a coil.

A light emitting diode can be an electromagnetic radiation emitting semiconductor light emitting diode, an inorganic light emitting diode (LED) and/or an organic light emitting diode (OLED). A light emitting diode can be part of an integrated circuit. A light emitting diode can emit for example light in the visible range, UV light and/or infrared light.

Figure 1:
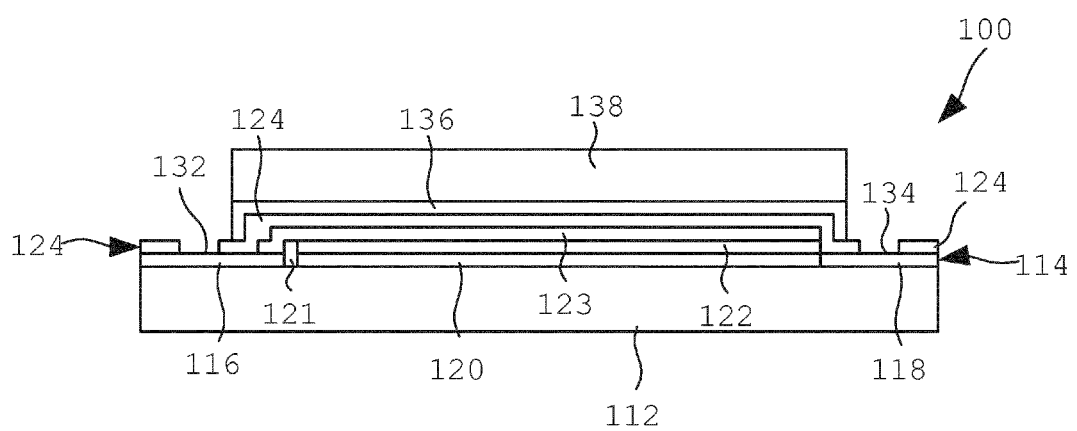
FIG. 1 shows a cross-sectional view of a region of an optoelectronic circuit in accordance with various embodiments.

FIG. 1 shows one embodiment of an organic light emitting diode 100. The organic light emitting diode 100 includes a carrier 112. The carrier 112 can be formed as translucent or transparent. The carrier 112 serves as carrier element for electronic elements or layers, for example light emitting elements. The carrier 112 may include or be formed from, for example, plastic, metal, glass, quartz and/or a semiconductor material. Furthermore, the carrier 112 may include or be formed from a plastics film or a laminate including one or a plurality of plastics films. The carrier 112 can be formed as mechanically rigid or mechanically flexible.

An optoelectronic layer structure is formed on the carrier 112. The optoelectronic layer structure includes a first electrode layer 14, which includes a first contact section 116, a second contact section 18 and a first electrode 120. The carrier 112 with the first electrode layer 114 can also be referred to as substrate. A first barrier layer (not illustrated), for example a first barrier thin-film layer, can be formed between the carrier 112 and the first electrode layer 114.

The first electrode 120 is electrically insulated from the first contact section 16 by means of an electrical insulation barrier 121. The second contact section 118 is electrically coupled to the first electrode 120 of the optoelectronic layer structure. The first electrode 120 can be formed as anode or as cathode. The first electrode 120 can be formed as translucent or transparent. The first electrode 120 includes an electrically conductive material, for example metal and/or a transparent conductive oxide (TCO), or a layer stack of a plurality of layers including metals or TCOs. The first electrode 120 may include for example a layer stack of a combination of a layer of a metal on a layer of a TCO, or vice versa. One example is a silver layer applied on an indium tin oxide layer (ITO) (Ag on ITO) or ITO-Ag-ITO multilayers. The first electrode 120 may include as an alternative or in addition to the materials mentioned: networks composed of metallic nanowires and nanoparticles, for example composed of Ag, networks composed of carbon nanotubes, graphene particles and graphene layers and/or networks composed of semiconducting nanowires.

An optically functional layer structure, for example an organic functional layer structure 122, of the optoelectronic layer structure is formed above the first electrode 120. The organic functional layer structure 122 may include for example one, two or more partial layers. By way of example, the organic functional layer structure 122 may include a hole injection layer, a hole transport layer, an emitter layer, an electron transport layer and/or an electron injection layer. The hole injection layer serves for reducing the band gap between first electrode and hole transport layer. In the case of the hole transport layer, the hole conductivity is greater than the electron conductivity. The hole transport layer serves for transporting the holes. In the case of the electron transport layer, the electron conductivity is greater than the hole conductivity. The electron transport layer serves for transporting the electrons. The electron injection layer serves for reducing the band gap between second electrode and electron transport layer. Furthermore, the organic functional layer structure 122 may include one, two or more functional layer structure units each including the above-mentioned partial layers and/or further intermediate layers.

Above the organic functional layer structure 122, a second electrode 123 of the optoelectronic layer structure is formed, which is electrically coupled to the first contact section 116. The second electrode 123 can be formed in accordance with one of the configurations of the first electrode 120, wherein the first electrode 120 and the second electrode 123 can be formed identically or differently. The first electrode 120 serves for example as anode or cathode of the optoelectronic layer structure. The second electrode 23 serves, correspondingly with respect to the first electrode, as cathode or anode of the optoelectronic layer structure.

The optoelectronic layer structure is an electrically and/or optically active region. The active region is for example the region of the optoelectronic component 100 in which electric current for the operation of the optoelectronic component 100 flows and/or in which electromagnetic radiation is generated or absorbed. A getter structure (not illustrated) can be arranged on or above the active region. The getter layer can be formed as translucent, transparent or opaque. The getter layer may include or be formed from a material which absorbs and binds substances that are harmful to the active region.

Above the second electrode 123 and partly above the first contact section 116 and partly above the second contact section 118, an encapsulation layer 124 of the optoelectronic layer structure is formed, which encapsulates the optoelectronic layer structure. The encapsulation layer 124 can be formed as second barrier layer, for example as second barrier thin-film layer. The encapsulation layer 124 can also be referred to as thin-film encapsulation. The encapsulation layer 124 forms a barrier against chemical contaminants and/or atmospheric substances, in particular against water (moisture) and oxygen. The encapsulation layer 124 can be formed as an individual layer, a layer stack or a layer structure. The encapsulation layer 124 may include or be formed from: aluminum oxide, zinc oxide, zirconium oxide, titanium oxide, hafnium oxide, tantalum oxide, lanthanum oxide, silicon oxide, silicon nitride, silicon oxynitride, indium tin oxide, indium zinc oxide, aluminum-doped zinc oxide, poly (p-phenylene terephthalamide), nylon 66, and mixtures and alloys thereof. If appropriate, the first barrier layer can be formed on the carrier 112 in a manner corresponding to a configuration of the encapsulation layer 24.

In the encapsulation layer 124, a first cutout of the encapsulation layer 124 is formed above the first contact section 116 and a second cutout of the encapsulation layer 124 is formed above the second contact section 118. A first contact region 132 is exposed in the first cutout of the encapsulation layer 124 and a second contact region 134 is exposed in the second cutout of the encapsulation layer 124. The first contact region 132 serves for electrically contacting the first contact section 116, and the second contact region 134 serves for electrically contacting the second contact section 118.

An adhesion medium layer 36 is formed above the encapsulation layer 124. The adhesion medium layer 136 includes for example an adhesion medium, for example an adhesive, for example a lamination adhesive, a lacquer and/or a resin. The adhesion medium layer 136 may include for example particles that scatter electromagnetic radiation, for example light-scattering particles.

A covering body 138 is formed above the adhesion medium layer 136. The adhesion medium layer 136 serves for fixing the covering body 138 to the encapsulation layer 124. The covering body 138 includes for example plastic, glass and/or metal. By way of example, the covering body 138 can be formed substantially from glass and include a thin metal layer, for example a metal film, and/or a graphite layer, for example a graphite laminate, on the glass body. The covering body 138 serves for protecting the conventional optoelectronic component 100, for example against mechanical force influences from outside. Furthermore, the covering body 138 can serve for distributing and/or dissipating heat that is generated in the conventional optoelectronic component 100. By way of example, the glass of the covering body 138 can serve as protection against external influences and the metal layer of the covering body 138 can serve for distributing and/or dissipating the heat that arises during the operation of the conventional optoelectronic component 100.

Figure 2A:
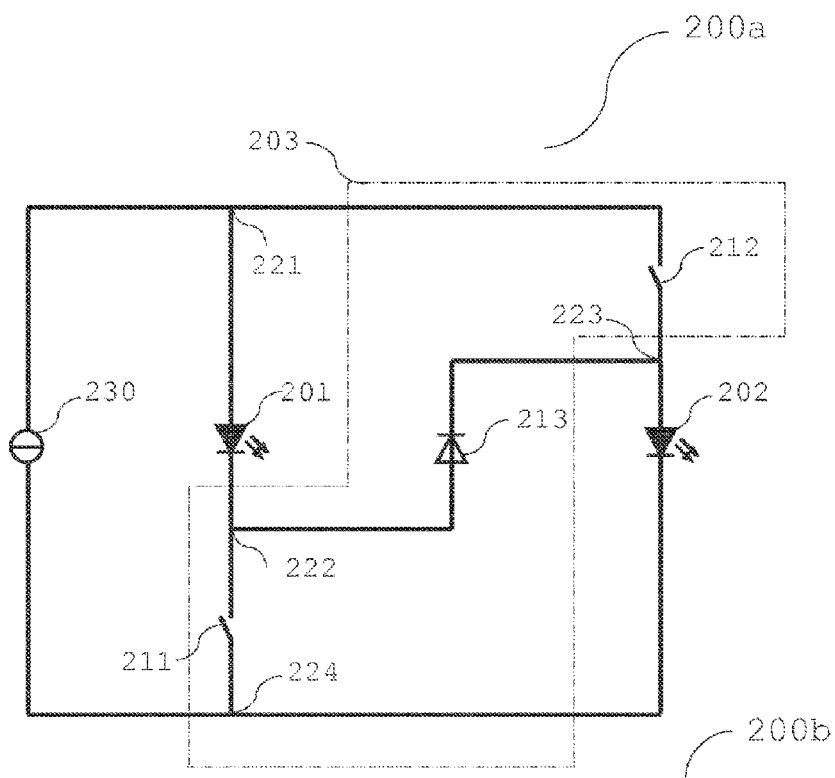
FIG. 2A shows a circuit diagram of an optoelectronic circuit in accordance with various embodiments.

FIG. 2A shows an embodiment of an optoelectronic circuit. The optoelectronic circuit 200a includes at least one first light emitting diode 201, at least one second light emitting diode 202, and a switch arrangement 203, wherein the switch arrangement 203 is connected between the at least one first light emitting diode 201 and the at least one second light emitting diode 202 in such a way and is configured in such a way that it switches over the first light emitting diode 201 and the second light emitting diode 202 between a series circuit formed by them and a parallel circuit formed by them, depending on a predefined ambient parameter.

The switch arrangement 203, which hereinafter is also referred to as series-parallel switchover 200a, is identified by means of the dash-dotted line in FIG. 2A. The series circuit, furthermore also referred to as series connection, including the at least one first light emitting diode 201 together with the at least one second light emitting diode 202, hereinafter is also referred to as first operating mode. The parallel circuit including the at least one first light emitting diode 201 together with the at least one second light emitting diode 202 hereinafter is also referred to as second operating mode. By means of the switch arrangement 203 it is possible to switch over the optoelectronic circuit 200a from a first operating mode into a second operating mode. Furthermore, the optoelectronic circuit 200a includes an energy source 230. The energy source 230 can be formed as a switch-mode power supply unit, for example as current source 230, for example as voltage source 230.

In accordance with one development, the predefined ambient parameter is an ambient parameter that is independent of the optoelectronic circuit 200a. The independent ambient parameter can be a parameter of the surroundings of the optoelectronic circuit 200a, for example of a region external to the optoelectronic circuit.

In accordance with one development, the predefined ambient parameter is a temperature, for example an external temperature. The switch arrangement 203 switches from the first operating mode into the second operating mode depending on the temperature, or the switch arrangement 203 switches from the second operating mode into the first operating mode depending on the temperature.

In accordance with one development, the predefined ambient parameter is a temperature-dependent operating voltage and/or a temperature-dependent operating current of the at least one first light emitting diode 201 or of the at least one second light emitting diode 202.

In order to achieve a predefined emission characteristic, for example a predefined brightness, of a light emitting diode, said light emitting diode requires a specific forward voltage or a specific forward current. By way of example, the required forward current can be provided by a current source 230. The current source 230 impresses a constant operating current into the optoelectronic circuit 200a. The resistance of the light emitting diodes 201, 202 may increase as the temperature decreases. In order that the operating current provided by the current source 230 is kept constant, the current source 230 changes the operating voltage applied by the current source 230 depending on the temperature-dependent resistance of the light emitting diodes 201, 202. The operating voltage applied by the current source 230 increases as the resistance of the light emitting diodes 201, 202 increases, in order to keep the operating current constant. However, the current source 230 may have a maximum voltage that cannot be exceeded. It may happen that the operating current provided by the current source 230 is smaller than the required forward current of the light emitting diodes 201, 202. In other words, if a specific limiting temperature is undershot, the light emitting diodes 201, 202 require more voltage than can be provided by the driver 230. However, if a switchover is then effected from a series circuit including the first light emitting diode 201 together with the second light emitting diode 202 into a parallel circuit including the first light emitting diode 201 together with the second light emitting diode, the output current has to be increased, but in return the required output voltage decreases. In this regard, the current source 230 can provide enough power to the first light emitting diode 201 and the second light emitting diode 202.

In accordance with one development, the switch arrangement 203 switches over from the first operating mode into the second operating mode depending on the temperature-dependent operating voltage or the temperature-dependent operating current.

In accordance with one development, the switch arrangement 203 is formed in such a way that it switches over from a series circuit formed by the light emitting diodes 201, 202 to a parallel circuit formed by the light emitting diodes 201, 202 if the operating current provided by the current source 230 is smaller than the required forward current.

In accordance with one development, the switch arrangement 203 is formed in such a way that it switches over from a series circuit formed by the light emitting diodes 201, 202 into a parallel circuit formed by the light emitting diodes 201, 202 if the operating voltage provided by the current source 230 reaches or exceeds a predefined limiting operating voltage. By way of example, the predefined limiting operating voltage may have a voltage value that is below the maximum voltage that can be provided by the current source 230.

In accordance with one development, the switch arrangement 203 includes at least one ground-referenced switch. If a switch is ground-referenced, then this enables a particularly simple and cost-effective driving of said switch.

In accordance with one development, the switch arrangement 203 includes a first switch 211, a second switch 212 and a diode 213. As shown in FIG. 2A, the optoelectronic circuit 200a includes a first node 221, which is connected to a second node 222 via the first light emitting diode 201. The second node 222 is connected to a third node 223 via the diode 213. The third node 223 is furthermore connected to the first node 221 via the second switch 212. The third node 223 is furthermore connected to a fourth node 224 via the second light emitting diode 202. The fourth node 224 is connected to the second node 222 via the first switch 211. The energy source 230 is connected to the first node 221 and the fourth node 224. The anode of the first light emitting diode 201 faces in the direction of the first node 221 and the cathode of the first light emitting diode 201 faces in the direction of the second node 222. The anode of the second light emitting diode 202 faces in the direction of the third node 223 and the cathode of the second light emitting diode faces in the direction of the fourth node 224. The anode of the diode 213 faces in the direction of the second node 222 and the cathode of the diode faces in the direction of the third node 223. The first light emitting diode 201 is arranged together with the first switch 211 in a first partial string 240, hereinafter also referred to as first parallel string 240 or first parallel branch 240, of the optoelectronic circuit 200a, 200b. The first parallel branch 240 is arranged between the first node 221 and the fourth node 224. The second light emitting diode 202 is arranged together with the second switch 212 in a second partial string 250, hereinafter also referred to as second parallel string 250 or second parallel branch 250, of the optoelectronic circuit 200a, 200b. The first partial string 240 is identified by means of a dash-dotted line in FIG. 2B, and the second partial string 250 is identified by means of a dashed line in FIG. 2B.

If the first switch 211 and the second switch 212 are open, the first light emitting diode 201 and the second light emitting diode are connected in series with one another; this is referred to hereinafter as first operating mode of the optoelectronic circuit 200a, 200b. If the first switch 211 and the second switch 212 are closed, the first light emitting diode 201 and the second light emitting diode are connected in parallel with one another; this is referred to hereinafter as second operating mode of the optoelectronic circuit 200a, 200b.

In accordance with one development, the first switch 211 is ground-referenced. In accordance with one development, the first switch 211 and/or the second switch 212 are/is formed by or include(s) a MOSFET (MOSFET: metal-oxide-semiconductor field-effect transistor).

In accordance with one development, the at least one first light emitting diode 201 and/or the at least one second light emitting diode 202 are/is configured as organic light emitting diodes. In accordance with one development, the first light emitting diode 201 and/or the second light emitting diode 202 are/is formed in accordance with one embodiment of the organic light emitting diode 100 as described thoroughly further above. If both light emitting diodes are formed as organic light emitting diodes, then the series connection of first light emitting diode 201 and second light emitting diode 202 hereinafter is also referred to as OLED series circuit. The parallel circuit including two organic light emitting diodes is hereinafter also referred to as OLED parallel circuit.

Light emitting diodes are operated in a wide ambient temperature range. Typical temperature ranges are for example −40° to 105° C. in the automotive industry or for example approximately −30° to +60° C. in the outdoor lighting sector. Light emitting diodes, in particular organic light emitting diodes, exhibit a temperature-dependent forward voltage behavior. At very low temperatures, which occur rather infrequently, OLEDs have a significantly higher forward voltage than at the typical temperatures of for example 25° C. room temperature. One problem here is that at low temperatures OLEDs consume a higher power and the driver should be correspondingly designed for this. However, this can be implemented, albeit not in a desired manner, by means of a corresponding overdimensioning of the driver electronics. A further problem here is primarily the fact that this increased power at low temperatures is provided by increased voltage. This may cause a relatively great cost and/or efficiency problem for the overall system: SELV (safety extra low voltage) drivers are often applied in the case of luminaires. In this case, normatively the maximum voltage in the system is limited, but in return the insulation requirements imposed on the luminaire, the materials and also air clearances and creepage paths are reduced. Typical voltage limits according to a luminaire standard are enumerated in a simplified representation below:

34 $V_{DC}$ (fully touchable, no insulation necessary)
60 $V_{DC}$ (in part simple insulation necessary)
120 $V_{DC}$ (simple insulation necessary).

For a maximum energy efficiency and cost-effectiveness, a maximum number of components in series are connected to a current-regulated driver channel. Depending on the type of OLED, for example a number of eight OLEDs, each at 7 V at room temperature, can be connected to a driver at 60 V SELV. If this luminaire is then also operated at very low temperatures, approximately 10.5 V instead of 7 V should be taken into account for example for each OLED. Thus, for an outdoor luminaire, only five OLEDs can be connected to one channel. Thus, an exemplary outdoor luminaire including eight OLEDs requires a two-channel ballast, which is more expensive and less efficient than a one-channel ballast. This is true even though rather warmer temperatures prevail during most of the time of operation. Since the maximum output voltage per channel on a ballast in the SELV range is normatively capped, the increase in power of OLEDs at low temperatures by way of the increased voltage is a cost and efficiency problem. Multi-channel drivers or a plurality of single-channel drivers can usually be used, which with the maximally series-connected OLEDs are designed for the maximum OLED voltage at the lowest temperature. In the normal case, for example at room temperature, a maximum number of OLEDs are connected in series at a current-regulated switch-mode power supply unit. As a result, maximum efficiency and the lowest costs are achieved in the most frequently used operating mode. If the temperature falls, or the forward voltage of the OLEDs increases, wherein the required forward voltage can no longer be provided by the switch-mode power supply unit because it reaches voltage compliance, for example owing to a standard limit of 60 $V_{max}$, then the OLED series circuit is switched over to an OLED parallel circuit. Consequently, a voltage that is below the maximum voltage limit is reached again; in return, the forward current of the switch-mode power supply unit is increased since the currents in parallel connection are divided. Two switches and a diode are required for this purpose.

In accordance with one development, the at least one first light emitting diode 201 and the at least one second light emitting diode 202 are formed on a common substrate. This makes it possible to produce the first light emitting diode 201 and the second light emitting diode 202 in a particularly cost-effective manner since for example both light emitting diodes can be produced in one process step.

In accordance with one development, two organic light emitting diodes are formed on a common substrate. The arrangement of two organic light emitting diodes on a common substrate hereinafter is also referred to as double OLED. In this case, two OLEDs are arranged on a substrate in a manner electrically insulated from one another. Physically this involves one single component which, however, now contains two OLEDs having 4 electrodes instead of one OLED having two electrodes. The two diodes are arranged in a manner stacked one above the other.

Alternatively or additionally, by means of the switch arrangement 203 it is possible to switch over the optoelectronic circuit 200a from a second operating mode into a first operating mode.

Alternatively or additionally, the switch arrangement 203 is configured in such a way that, in the event of a predefined temperature being undershot, a switchover is effected from a series circuit including the first light emitting diode 201 and the second light emitting diode 202 to a parallel circuit including the first light emitting diode 201 and the second light emitting diode 202. Alternatively or additionally, the first switch 211 and the second switch are closed in the event of the predefined temperature being undershot.

Alternatively or additionally, the ambient parameter that is independent of the optoelectronic circuit 200a is a pressure, for example an air pressure, an air humidity and/or an intensity of an electromagnetic radiation incident on the optoelectronic circuit 200a. Alternatively or additionally, the ambient parameter that is independent of the optoelectronic circuit 200a is a parameter which directly or indirectly influences or adversely affects the optoelectronic circuit 200a, for example an ambient parameter that adversely affects the efficiency of the optoelectronic circuit 200a. Alternatively or additionally, the at least one first light emitting diode 201 and/or the at least one second light emitting diode 202 can be formed in such a way as to emit light having a white, violet, red, green, blue or yellow hue. Alternatively or additionally, the first light emitting diode 201 and the second light emitting diode 202 emit light having the same hue or having a different hue during operation.

As an alternative to stacking two mutually insulated OLEDs one above the other, the two organic light emitting diodes are arranged alongside one another. Alternatively or additionally, the substrate of the double OLED is an integral substrate. Alternatively or additionally, the common substrate of the first light emitting diode 201 and of the second light emitting diode 202 is formed like an above-described embodiment of the carrier 112.

Alternatively or additionally, the first light emitting diode 201 and/or the second light emitting diode 202 include(s) in each case further light emitting diodes. Alternatively or additionally, the further light emitting diodes of the at least one first light emitting diode 201 are connected in series with the at least one first light emitting diode 201. Alternatively or additionally, the further light emitting diodes of the at least one second light emitting diode 202 are connected in series with the at least one second light emitting diode 202.

Figure 2B:
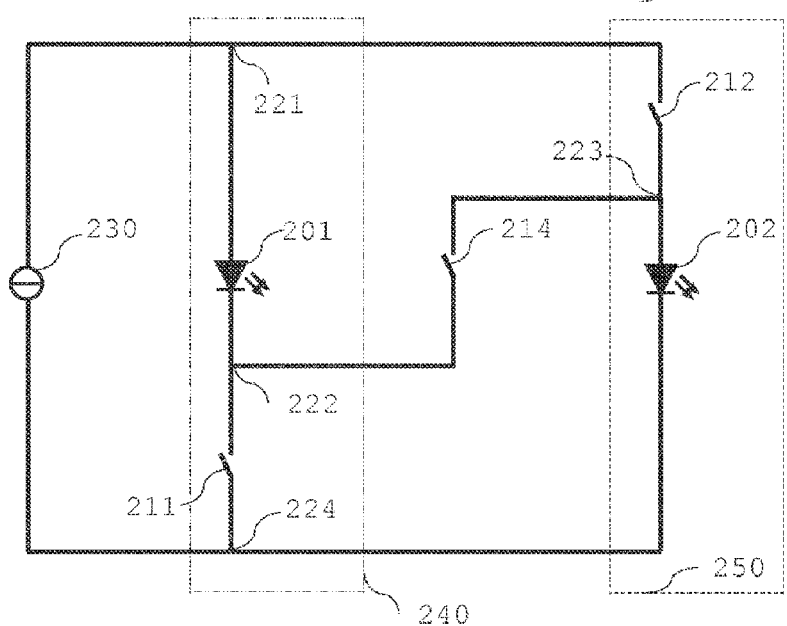
FIG. 2B shows a circuit diagram of an optoelectronic circuit in accordance with various embodiments.

FIG. 2B shows one embodiment of an optoelectronic circuit which largely corresponds to the embodiment shown in FIG. 2A. In contrast to the optoelectronic circuit 200a shown in FIG. 2A, the optoelectronic circuit 200b includes a third switch 214 instead of the diode 213.

If the third switch 214 is closed and the first switch 211 and the second switch 212 are open, the first light emitting diode 201 and the second light emitting diode 202 are connected in series with one another. If the third switch 214 is open and the first switch 211 and the second switch 212 are closed, the first light emitting diode 201 and the second light emitting diode are connected in parallel with one another.

In accordance with one development, the third switch 214 is formed by or includes a MOSFET. Transistors are usually more costly than diodes, but the heat losses can be reduced when a transistor is used. One advantage of the circuit described above is that the losses in series circuit operation are reduced.

Figure 3:
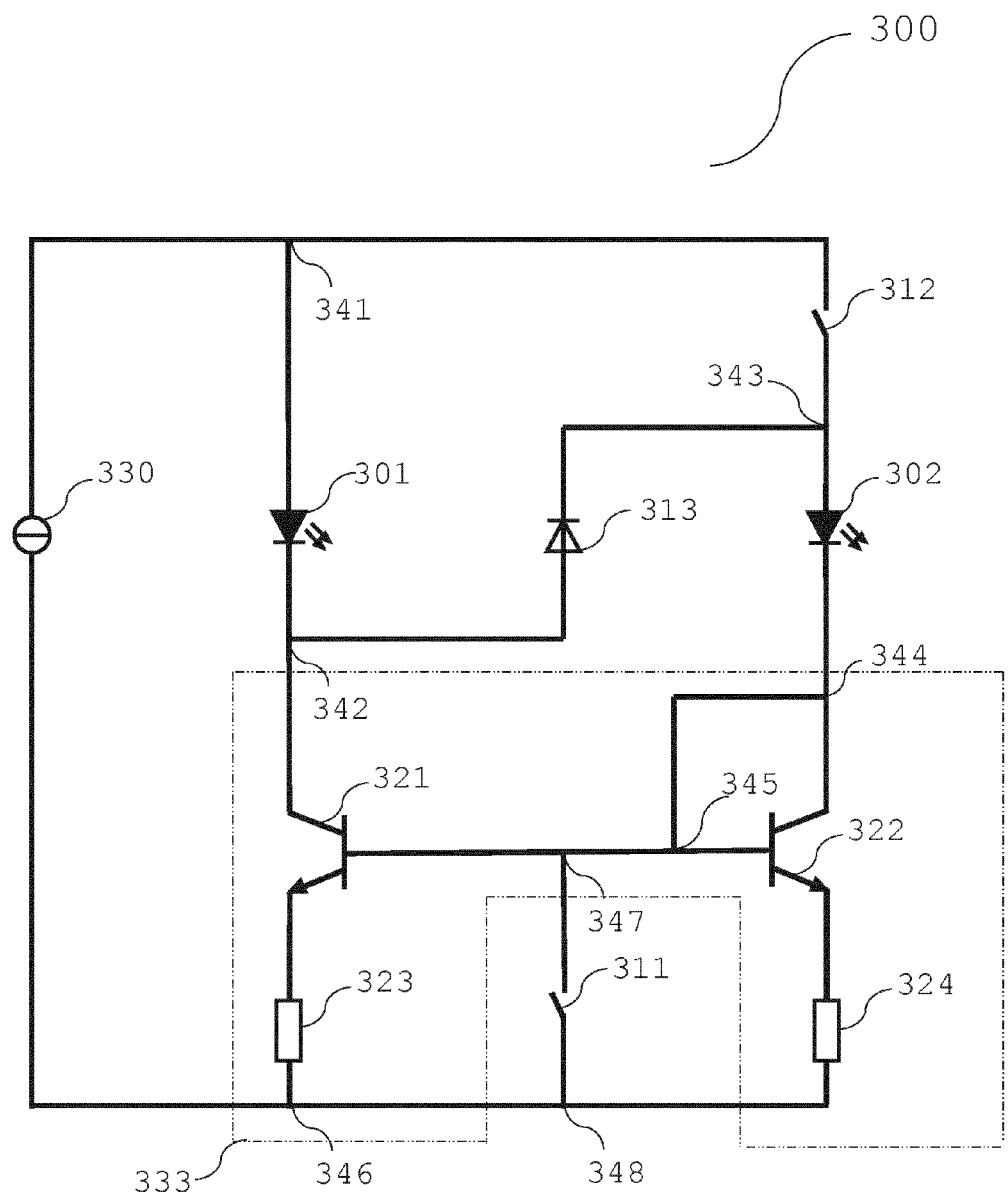
FIG. 3 shows a circuit diagram of an optoelectronic circuit in accordance with various embodiments.

FIG. 3 shows one embodiment of an optoelectronic circuit which largely corresponds to the embodiment shown in FIG. 2A. Like the above-described optoelectronic circuit 200a shown in FIG. 2A, the optoelectronic circuit 300 includes an energy source 330, at least one first light emitting diode 301, at least one second light emitting diode 302 and a diode 313.

The optoelectronic circuit 300 furthermore includes a switch arrangement formed to the greatest possible extent like the switch arrangement 203 of the optoelectronic circuit 200a, 200b. The switch arrangement of the optoelectronic circuit 300 includes a first switch 311 and a second switch 312.

In accordance with one development, the optoelectronic circuit 300 furthermore includes a current matching circuit 333 for matching the currents through the at least one first light emitting diode 301 an the at least one second light emitting diode 302. The current matching circuit 333 is identified by means of a dash-dotted line in FIG. 3.

In the case of a parallel circuit including the first light emitting diode 301 and the second light emitting diode 302, the energy source 330 provides double the amount of current for operation of the two light emitting diodes in comparison with a series connection of the two light emitting diodes. If the two light emitting diodes are not formed approximately identically, for example if the two light emitting diodes have different component tolerances, then the current through the two light emitting diodes is not divided exactly symmetrically. In other words, as a result of different component tolerances, in a parallel circuit including two light emitting diodes it may happen that the current that flows through the first light emitting diode 301 is different in terms of absolute value than the current which flows through the second light emitting diode 302. This may lead for example to different aging of the two light emitting diodes and/or, for example, to the two light emitting diodes differing from one another in terms of their emission characteristic. By means of the current matching circuit 333, the currents through the first light emitting diode 301 and through the second light emitting diode 302 are matched in such a way that in terms of absolute value the same current flows through the first light emitting diode 301 and through the second light emitting diode 302. In other words, the currents that flow through the first light emitting diode 301 and through the second light emitting diode 302 in the second operating mode are balanced by means of the current matching circuit 333.

In accordance with one development, the current matching circuit 333 includes a current mirror circuit 333. By means of the current mirror circuit, the current matching circuit 333 can be realized particularly simply and cost-effectively.

In accordance with one development, the current mirror circuit includes a first transistor 321, a first electrical resistor 323, a second transistor 322 and a second electrical resistor 324. The first transistor 321, hereinafter also referred to as first current mirror transistor 321, and the second transistor 322, hereinafter also referred to as second current mirror transistor 322, each include an emitter terminal, hereinafter also referred to as emitter, a collector terminal, hereinafter also referred to as collector, and a base terminal, hereinafter also referred to as base.

In accordance with one development, the switch arrangement is furthermore configured to form the series circuit including the at least one first light emitting diode and the at least one second light emitting diode whilst bypassing the current matching circuit 333.

Since a linear regulator, which may include for example at least one transistor and/or at least one electrical resistor, is lossy, ideally no linear regulator ought to be arranged in the electrical circuit if all the OLEDs are connected in series. The current regulation is effected by means of a switch-mode power supply unit, particularly in the case of a conversion of 230 $V_{AC}$ into a DC voltage. If the current regulation in the optoelectronic circuit 200a, 200b, 300 is effected by means of a switch-mode power supply unit, then the switch-mode power supply unit always matches its output voltage in an energy-efficient manner in such a way that a predefined constant output current is established. If the first light emitting diode 301 and the second light emitting diode 302 are connected in series with one another, then the output current of the current-regulated drive corresponds to the current that flows through the series circuit including the first light emitting diode 301 and the second light emitting diode 302. Consequently, the current of the first light emitting diode 301 and of the second light emitting diode 302 is regulated by the switch-mode power supply unit and no additional linear regulators are required.

During parallel operation, a linear regulator can be arranged in one of the two parallel branches or in both parallel branches, said linear regulator serving for a symmetrical current distribution between the two parallel branches. The two linear regulators can advantageously be embodied as current mirror circuit, which in the case of the parallel circuit automatically and independently of the total input current divide the current symmetrically between both parallel strings. Thus, in a very cost-effective manner, an identical current density is ensured in all OLED components, despite division into two strings. Furthermore, if an OLED forms a short circuit and thus shortens a parallel string, then the current mirror circuit advantageously compensates for these different string voltages.

In accordance with one development, the optoelectronic circuit 300 includes a first node 341, which is connected to a second node 342 via the first light emitting diode 301, shown by way of example in FIG. 3. The second node 342 is connected to a third node 343 via the diode 313. The third node 343 is furthermore connected to the first node 341 via the second switch 312. The third node 343 is furthermore connected to a fourth node 344 via the second light emitting diode 302. The fourth node 344 is connected to a fifth node 345. The second node 342 is connected to a sixth node 346 via the first transistor 321 and the first resistor 323. The second node 342 is connected to the collector of the first transistor 321. The emitter of the first transistor 321 is connected to the first resistor 323. The first transistor 321 is connected in series with the first resistor 323. The fifth node 345 is connected to the base of the first transistor 321 via a seventh node 347. The fourth node 344 is connected to the collector of the second transistor 322. The fourth node 344 is connected to an eighth node 348 via the second transistor 322 and the second resistor 324. The second transistor 322 is connected in series with the second resistor 324. The emitter of the second transistor 322 is connected to the second resistor 324. The eighth node 348 is connected to the seventh node 347 via a second switch 311. The energy source 330 is connected to the first node 341 and the sixth node 346. The anode of the first light emitting diode 301 faces in the direction of the first node 341 and the cathode of the first light emitting diode 301 faces in the direction of the second node 342. The anode of the second light emitting diode 302 faces in the direction of the third node 343 and the cathode of the second light emitting diode 302 faces in the direction of the fourth node 344. The anode of the diode 313 faces in the direction of the second node 342 and the cathode of the diode faces in the direction of the third node 343.

In accordance with one development, the first switch 311 is formed as a ground-referenced switch. If the switch 311 is ground-referenced, then this enables a particularly simple and cost-effective driving of said switch.

If the first switch 311 is closed and the second switch 312 is open, then the optoelectronic circuit 300 is in a first operating mode and the at least one first light emitting diode 301 is connected in series with the at least one second light emitting diode 302. If the first switch 311 is closed, the second transistor 322 is bridged by means of the path between the fourth node and the fifth node 345.

In the case of the current mirror circuit 333, the above-mentioned first switch 311, which connects an OLED partial string (the left partial string in FIG. 3) for the parallel connection of the OLEDs to ground, entails the following problem: There are a number of possibilities for arranging the switch 311 in the optoelectronic circuit 300. Either the switch 311, for example a MOSFET, is arranged close to the collector side of the first current mirror transistor 321, and then a high-side driving is required for this switch. That is more complex and more expensive than the above-described arrangement of the first switch 311, since the first switch 311 is thus no longer ground-referenced. Alternatively the first switch 311 including a more cost-effective n-MOSFET is placed close to the emitter side of the first transistor 321 in a ground-referenced fashion, which has the disadvantage that the current mirror circuit 333 is no longer formed symmetrically and the OLED current is no longer divided symmetrically between both parallel strings. Here, therefore, advantageously the ground-referenced first switch 311 is connected to the base of the two current mirror transistors and turned on when a series circuit is desired. Consequently, the complex and costly high-side driving is not necessary. Furthermore, two functions arise in one switch: Firstly, the first switch 311 switches the first transistor 321 in a high-resistance fashion, which is necessary for the series connection, by said switch short-circuiting the base-emitter junction, also referred to as BE junction. Secondly, the first switch 311 simultaneously and in a simple manner short-circuits the second transistor 322 and avoids ohmic losses at the latter, thus resulting in an increase in efficiency in series circuit operation.

One advantage of the circuit described above is that the two currents are automatically rendered symmetrical in parallel operation and identical luminance and ageing of both light emitting diodes are ensured as a result, since voltage differences for the OLEDs in the different parallel strings are compensated for. Furthermore, in the case of a short circuit in a string, the current mirror nevertheless matches the string currents. Further advantages of the circuit described above are that only a small number of switches are necessary, that only a small number of high-side drivings of the switches are required, that the symmetry of the current mirror circuit 333 is not impaired by the switches mentioned above, and that the second transistor 322 is automatically bridged in series operation, which leads to a maximum efficiency of the optoelectronic circuit 300 described above. A further advantage of the optoelectronic circuit 300 described above is that, in a most frequently occurring operating mode, for example in a first operating mode, for example at temperatures around room temperature, the optoelectronic circuit 300 is operated with a maximum voltage capacity utilization of a driver channel, or with a minimum number of channels, or with a maximum efficiency.

Alternatively or additionally, the first resistor 323 and/or the second resistor 324 can be optional. In other words, the first resistor 323 and/or the second resistor 324 can have the value 0Ω. In an alternative equivalent circuit diagram, the two resistors 323, 324 would accordingly be replaced by wire bridges.

Figure 4:
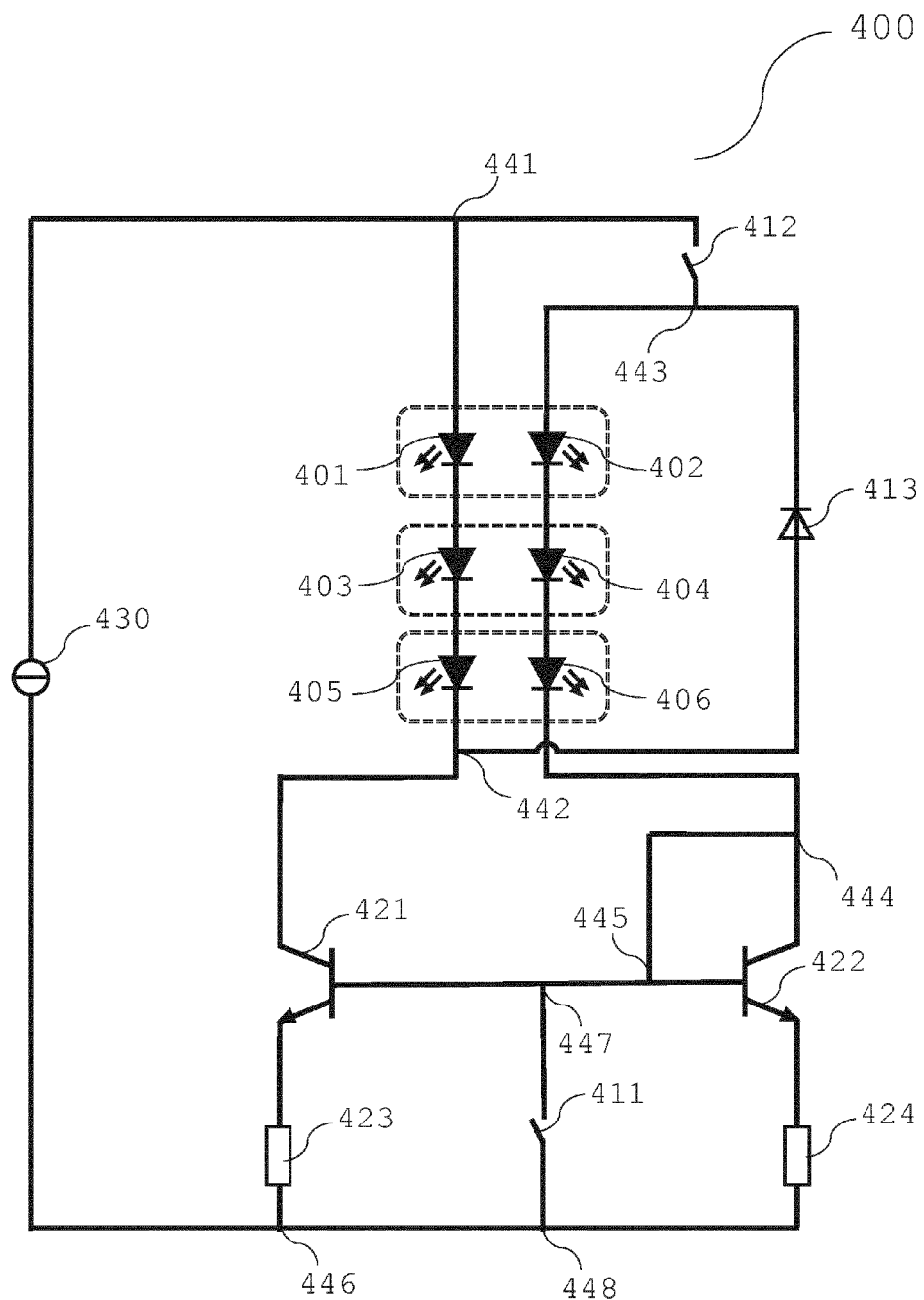
FIG. 4 shows a circuit diagram of an optoelectronic circuit in accordance with various embodiments.

FIG. 4 shows one embodiment of an optoelectronic circuit which largely corresponds to the embodiment shown in FIG. 3.

The optoelectronic circuit 400 includes a switch arrangement formed in accordance with an above-described embodiment of the switch arrangement 203, and a current matching circuit formed in accordance with an above-described embodiment of the current matching circuit 333. Furthermore, the optoelectronic circuit 400 includes a first light emitting diode 401, a second light emitting diode 402, a third light emitting diode 403, a fourth light emitting diode 404, a fifth light emitting diode 405 and a sixth light emitting diode 406. As shown in FIG. 4, the first light emitting diode 401, the third light emitting diode 403 and the fifth light emitting diode 405 are connected in series with one another. Furthermore, the second light emitting diode 402, the fourth light emitting diode 404 and the sixth light emitting diode 406 are connected in series with one another.

In accordance with one development, the first light emitting diode 401 and the second light emitting diode 402 are formed on a common substrate, for example are formed as a double OLED, as is described further above. Furthermore, the third light emitting diode 403 and the fourth light emitting diode 404 are formed on a common substrate, for example as a double OLED. Furthermore, the fifth light emitting diode 405 and the sixth light emitting diode 406 are formed on a common substrate, for example as a double OLED.

In accordance with one development, further light emitting diodes, for example further double OLEDs, are arranged in the optoelectronic circuit 400, for example 4, 5, 6, 7, 10 or 100 double OLEDs.

As shown in FIG. 4, the optoelectronic circuit 400 includes a first node 441, which is connected to a second node 442 via the first light emitting diode 401, the third light emitting diode 403 and the fifth light emitting diode 405. Furthermore, the anodes of the first light emitting diode 401, of the third light emitting diode 403 and of the fifth light emitting diode 405 in each case face in the direction of the first node 441. The cathodes of the first light emitting diode 401, of the third light emitting diode 403 and of the fifth light emitting diode 405 in each case face in the direction of the second node 442. The first node 441 is connected to a third node 443 via the first switch 412. The third node 443 is connected to the second node 442 via a diode 413. The cathode of the diode 413 faces in the direction of the third node 443. The third node 443 is connected to a fourth node 444 via the second light emitting diode 402, the fourth light emitting diode 404 and the sixth light emitting diode 406. The fourth node 444 is connected to a fifth node 445. The fifth node 445 is connected to the base of a first transistor 421. The second node 442 is connected to a sixth node 446 via the first transistor 421 and a first resistor 423. The second node 442 is connected to the collector of the first transistor 421. The emitter of the first transistor 421 is connected to the first resistor 423. The first transistor 421 is connected in series with the first resistor 423. The fourth node 444 is connected to the collector of a second transistor 422. The fourth node 444 is connected to an eighth node 448 via the second transistor 422 and a second resistor 424. The second transistor 422 is connected in series with the second resistor 424. The emitter of the second transistor 422 is connected to the second resistor 424. The eighth node 448 is connected to the seventh node 447 via a second switch 411. The energy source 430 is connected to the first node 441 and the sixth node 446. Furthermore, the combination of the series-parallel switchover with double OLEDs is particularly advantageous. This involves an OLED arrangement including two organic LEDs that are electrically insulated from one another, wherein the two organic LEDs are applied on a common substrate. Physically, therefore, this involves a single component which, however, now contains two diodes having four electrodes instead of one diode having two electrodes. The two diodes are arranged for example in a manner stacked one above the other.

In the case of the current mirror circuit 333, for example in the case of the parallel connection of two parallel branches, it is particularly efficient if the left and right parallel branches have a forward voltage that is as similar as possible. The linearly regulated current mirror transistors then have to convert the least voltage difference into power loss. Depending on the installation situation, for example in the case of different cooling, different heat convection, and/or in the case of heat accumulation in the luminaire, OLEDs may have a different forward voltage. If two OLEDs are formed on a common substrate, then both OLEDs have approximately the same temperature. Both parallel strings in parallel operation have approximately the same temperature, and thus matched forward voltages. This advantageous property can be utilized by always connecting one diode of the double OLED into the left string and the second diode of the double OLED into the right string. As a result, the OLEDs in the left parallel string and in the right parallel string have approximately the same temperature and the voltage difference between the left parallel string and the right parallel string is minimized. A further advantage of this circuit is described below: both diodes of a double OLED are arranged spatially close to one another. A spatially close arrangement of two OLEDs on a common substrate is realized for example by stacking very thin layers one above another.

Conventionally there is thus an increased probability that, in the case of a short circuit or some other defect in one OLED, the other OLED will also be detrimentally affected, for example by virtue of the second OLED also suffering a short circuit.

However, if the two OLEDs of a double OLED are in each case always distributed between the two parallel strings, then the total forward voltages of the two parallel strings remain approximately identical even in the case of a short circuit of an OLED, since each parallel string experiences approximately the same forward voltage reduction. By means of the double OLEDs, therefore, in the case of a short circuit, the current mirror transistors are not loaded by additional forward voltage imbalance or asymmetry and the driver still remains maximally efficient. In the case of a short circuit, with high probability both parallel strings are shortened, but the string voltage remains symmetrical. With use of linear regulators or of the current mirror circuit 333, by means of matched parallel string voltages the power loss is minimized and the efficiency is thus maximized.

Figure 5:
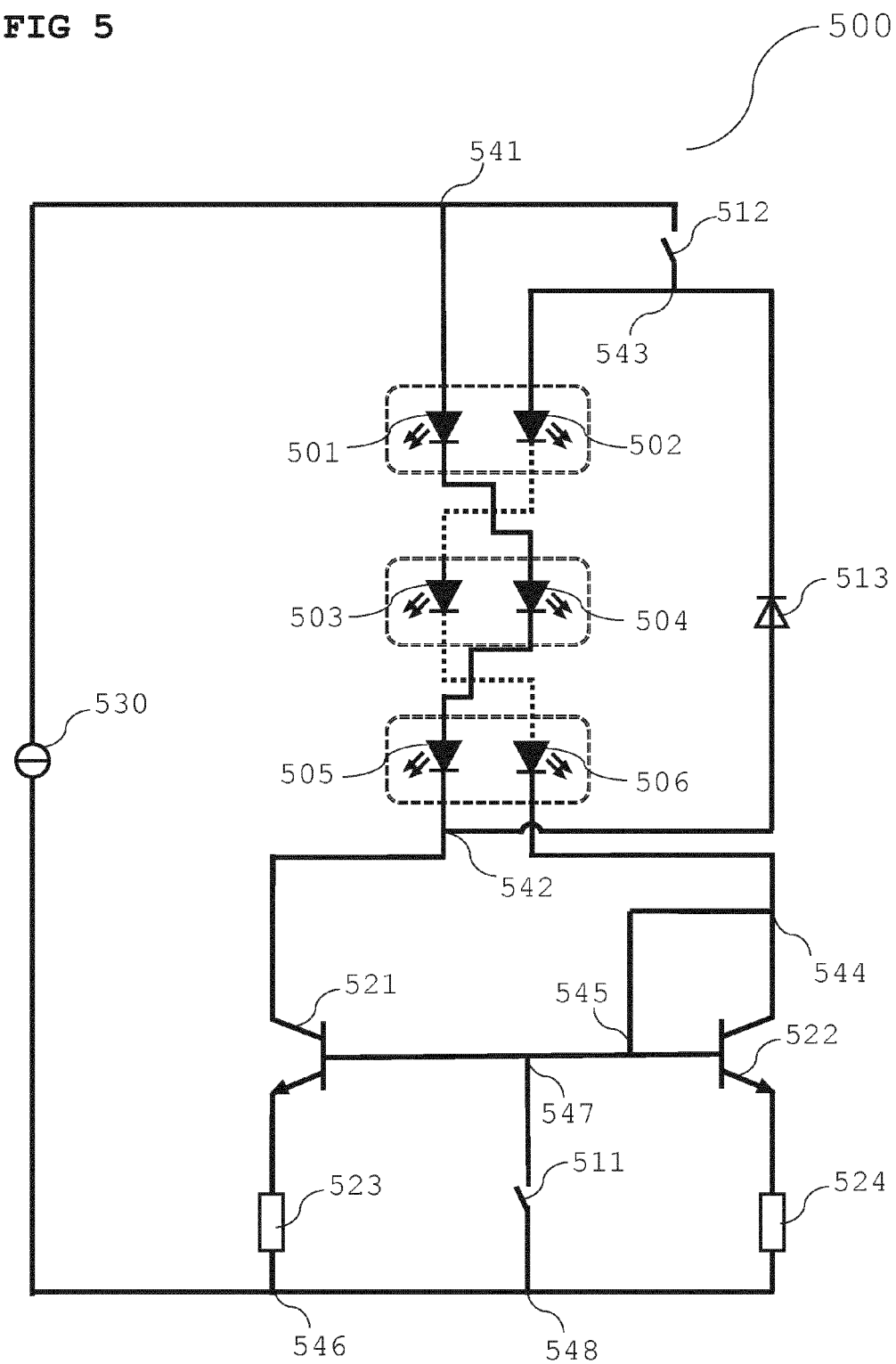
FIG. 5 shows a circuit diagram of an optoelectronic circuit in accordance with various embodiments.

FIG. 5 shows one embodiment of an optoelectronic circuit which largely corresponds to the embodiment of the optoelectronic circuit 400 as shown in FIG. 4.

The optoelectronic circuit 500 is formed in accordance with an above-described embodiment of the optoelectronic circuit 400.

In contrast to the optoelectronic circuit 400, the light emitting diodes of the optoelectronic circuit 500 are electrically connected to one another in a different way. The first light emitting diode 501, the fourth light emitting diode 504 and the fifth light emitting diode 505 are connected in series with one another and form a first parallel branch. Furthermore, the second light emitting diode 502, the third light emitting diode 503 and the sixth light emitting diode 506 are connected in series with one another and form a second parallel branch. The optoelectronic circuit 500 includes a current matching circuit formed in accordance with an above-described embodiment of the current matching circuit 333. The current matching circuit matches the current through the first parallel branch and through the second parallel branch. Such a circuit affords the advantage that possible systematic faults during the production of double OLEDs are compensated for.

As shown in FIG. 5, the optoelectronic circuit 500 includes a first node 541, which is connected to a second node 542 via the first light emitting diode 501, the fourth light emitting diode 504 and the fifth light emitting diode 505. Furthermore, the anodes of the first light emitting diode 501, of the fourth light emitting diode 504 and of the fifth light emitting diode 505 in each case face in the direction of the first node 541. The cathodes of the first light emitting diode 501, of the fourth light emitting diode 504 and of the fifth light emitting diode 505 in each case face in the direction of the second node 542. The first node 541 is connected to a third node 543 via the first switch 512. The third node 543 is connected to the second node 542 via a diode 513. The cathode of the diode 513 faces in the direction of the third node 543. The third node 543 is connected to a fourth node 544 via the second light emitting diode 502, the third light emitting diode 503 and the sixth light emitting diode 506. The fourth node 544 is connected to a fifth node 545. The fifth node 545 is connected to the base of a first transistor 521. The second node 542 is connected to a sixth node 546 via the first transistor 521 and a first resistor 523. The second node 542 is connected to the collector of the first transistor 521. The emitter of the first transistor 521 is connected to the first resistor 523. The first transistor 521 is connected in series with the first resistor 523. The fourth node 544 is connected to the collector of a second transistor 522. The fourth node 544 is connected to an eighth node 548 via the second transistor 522 and a second resistor 524. The second transistor 522 is connected in series with the second resistor 524. The emitter of the second transistor 522 is connected to the second resistor 524. The eighth node 548 is connected to a seventh node 547 via a second switch 511. The energy source 530 is connected to the first node 541 and the sixth node 546.

Figure 6:
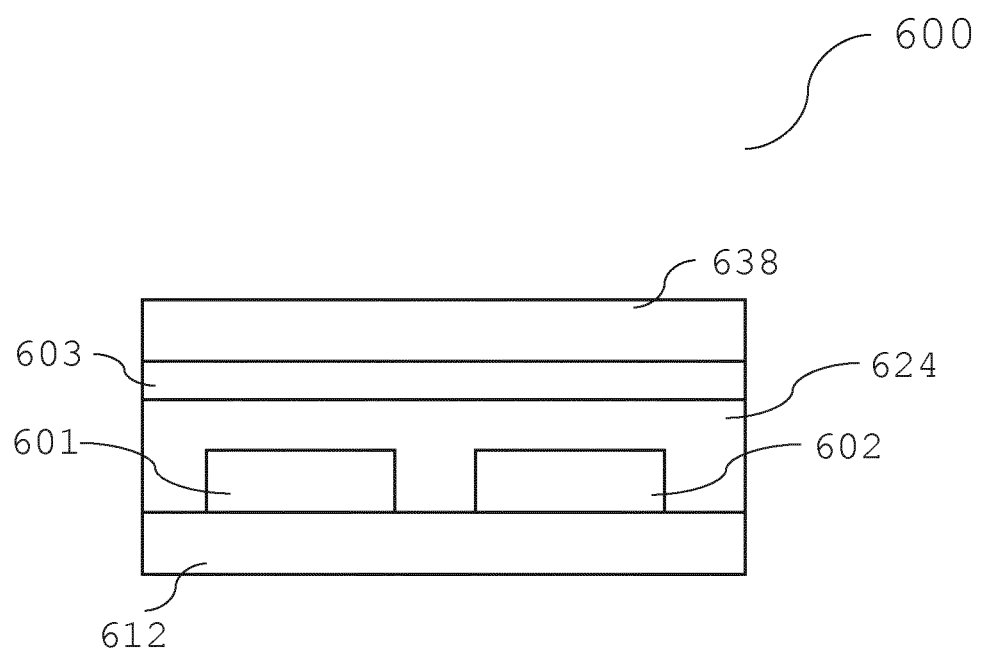
FIG. 6 shows a cross-sectional view of an optoelectronic component in accordance with various embodiments.

FIG. 6 shows one embodiment of an optoelectronic component 600 including an optoelectronic circuit 603. The optoelectronic circuit is formed in accordance with an embodiment described above. The optoelectronic circuit includes a first light emitting diode 601, a second light emitting diode 602 and a switch arrangement 603. The first light emitting diode 601 is formed in accordance with an embodiment described above. The second light emitting diode 602 is formed in accordance with an embodiment described above. The switch arrangement 603 is formed in accordance with an embodiment described above. The first light emitting diode 601 and the second light emitting diode 602 include a common carrier 612 and a common covering body 638. The common carrier is formed in accordance with an above-described embodiment of the carrier 112. The common covering body 638 is formed in accordance with an above-described embodiment of the covering body 138. The switch arrangement 603 is formed between the common carrier 612 and the common covering body 638.

In accordance with one development, the first light emitting diode 601 and the second light emitting diode 602 are formed alongside one another on the common carrier 612.

In accordance with one development, the switch arrangement 603 is formed on a common encapsulation 624 of the first light emitting diode 601 and of the second light emitting diode 602.

In accordance with one development, the optoelectronic circuit includes a current matching circuit. The current matching circuit is formed in accordance with an embodiment described above. The current matching circuit is formed between the common carrier 612 and the common covering body 638 (not illustrated).

Alternatively, the switch arrangement 603 and/or the current matching circuit are/is formed on the common carrier 612.

Alternatively or additionally, the switch arrangement 603 and/or the current matching circuit are/is formed by means of a thin-film and/or thick-film technology between the common carrier 612 and the common covering body 638.

Alternatively or additionally, all above-described component parts of the optoelectronic circuit, excluding the energy source and the light emitting diodes, are formed by means of thin-film and/or thick-film technology between the common carrier 612 and the common covering body 638. This makes it possible to provide a particularly flat optoelectronic component 600.

Alternatively, the first light emitting diode 601 and the second light emitting diode 602 are formed in a manner stacked one above the other on the common carrier 612.

Figure 7:
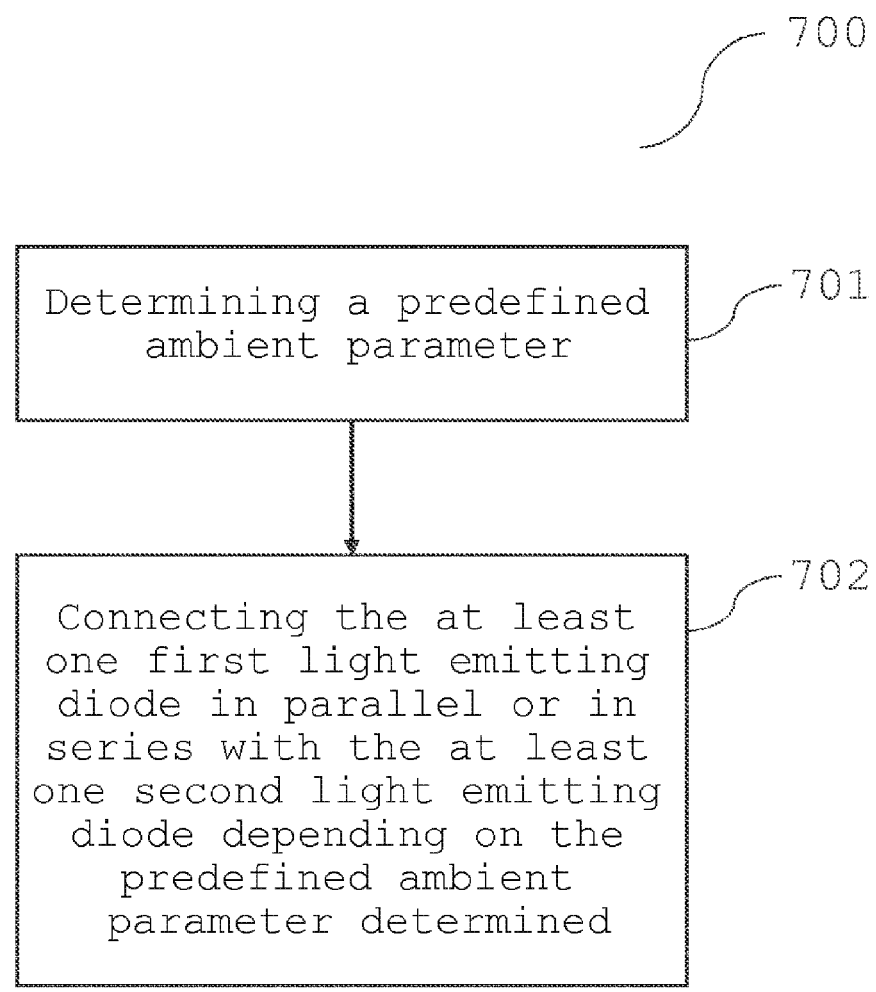
FIG. 7 shows a flow diagram of a method for operating an optoelectronic circuit in accordance with various embodiments.

FIG. 7 shows a flow diagram of a method for operating an optoelectronic circuit.

The optoelectronic circuit includes at least one first light emitting diode 201, 301, 401, 501, 601, at least one second light emitting diode 202, 302, 402, 502, 602 and a switch arrangement 203, which is connected between the at least one first light emitting diode 201, 301, 401, 501, 601 and the at least one second light emitting diode 202, 302, 402, 502, 602 in such a way and is configured in such a way that it switches over the first light emitting diode 201, 301, 401, 501, 601 and the second light emitting diode 202, 302, 402, 502, 602 between a series circuit formed by them and a parallel circuit formed by them, depending on a predefined ambient parameter; wherein the method 700 for operating the optoelectronic circuit 200a, 200b, 300, 400, 500 includes determining 701 a predefined ambient parameter and connecting 702 the at least one first light emitting diode 201, 301, 401, 501, 601 in parallel or in series with the at least one second light emitting diode 202, 302, 402, 502, 602 depending on the predefined ambient parameter determined. This makes it possible to operate the optoelectronic circuit 200a, 200b, 300, 400, 500 particularly efficiently and particularly cost-effectively.

The optoelectronic circuit 200a, 200b, 300, 400, 500 is formed in accordance with an above-described embodiment of the optoelectronic circuit 200a, 200b, 300, 400, 500. The optoelectronic circuit 200a, 200b, 300, 400, 500 includes an energy source formed in accordance with an above-described embodiment of the energy source 230, 330, 430, 530.

In accordance with one development, determining 701 the predefined ambient parameter includes measuring a temperature. In accordance with one development, the measured temperature is subsequently compared with a predefined limiting temperature. In accordance with one development, in the event of a predefined limiting temperature being reached and/or undershot, the optoelectronic circuit is switched over from a first operating mode into a second operating mode, wherein the first operating mode and the second operating mode are described thoroughly further above. In accordance with one development, the switch arrangement 203 switches over the optoelectronic circuit from the first operating mode into the second operating mode if the measured temperature is less than or equal to the predefined limiting temperature.

In accordance with one development, measuring the temperature is carried out by means of a temperature measuring device, for example by means of a thermometer, a thermoelement, an NTC thermistor (NTC—negative temperature coefficient) and/or a PTC thermistor (PTC—positive temperature coefficient).

In accordance with one development, determining 701 the predefined ambient parameter includes measuring a temperature-dependent operating voltage and/or measuring a temperature-dependent operating current.

In accordance with one development, determining 701 the predefined ambient parameter includes measuring an operating current provided by the current source 230, 330, 430, 530, and subsequently comparing the current provided by the current source 230, 330, 430, 530 with the required forward current of the at least one first light emitting diode and of the at least one second light emitting diode. In accordance with one development, the switch arrangement 203 switches over the optoelectronic circuit from the first operating mode into the second operating mode if the measured operating current is less than or equal to the required forward current. In order to measure the operating current through the light emitting diode 201, 301, 401, 501, 601, it is possible for example to connect a measuring device in series with the light emitting diode 201, 301, 401, 501, 601. The operating current through the second light emitting diode 202, 302, 402, 502, 602 can be measured in an analogous way. The fact of whether the operating current provided by the current source 230 is less than or equal to the required forward current of the light emitting diodes 201, 202 can be determined for example by means of measuring the output current of the driver 230 and subsequently comparing the output current of the driver 230 with the required forward current of the light emitting diodes 201, 202. The output current of the driver 230 can be measured for example at the node 221.

Alternatively or additionally, the optoelectronic circuit may first be in the second operating mode and then be switched over to the second operating mode. Alternatively or additionally, the switch arrangement 203 switches over the optoelectronic circuit from the second operating mode into the first operating mode if the measured temperature is greater than or equal to the predefined limiting temperature.

Alternatively, in the case of a current source 230, 330, 430, 530, it is possible to measure the total voltage made available by the driver 230, 330, 430, 530, that is to say the output voltage of the driver 230. The output voltage is measurable for example at the nodes 221 and 224. As an alternative thereto, it is possible for example to measure the operating voltage of the light emitting diode 201 at the light emitting diode 201. Alternatively or additionally, the switch arrangement 203 switches over the optoelectronic circuit from the first operating mode into the second operating mode if the measured operating voltage is less than or equal to the required forward voltage.

In various embodiments, the method 700 for operating the optoelectronic circuit may include features of the optoelectronic circuit and the optoelectronic circuit may include features of the method for operating the optoelectronic circuit in a manner such that and insofar as the features are expediently applicable in each case.

The present disclosure is not restricted to the embodiments indicated. By way of example, the embodiments shown in FIGS. 1, 2, 3, 4, 5 and 6 can be combined with one another.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

The invention claimed is:

1. An optoelectronic circuit, comprising:
   at least one first light emitting diode;
   at least one second light emitting diode;
   a switch arrangement, which is connected between the at least one first light emitting diode and the at least one second light emitting diode in such a way and is configured in such a way that it switches over the at least one first light emitting diode and the at least one second light emitting diode between a series circuit formed by them and a parallel circuit formed by them, depending on a predefined ambient parameter; wherein the switch arrangement comprises a diode or a switch for connecting the at least one first light emitting diode in series with the at least one second light emitting diode; and
   a current matching circuit for matching the currents through the at least one first light emitting diode and the at least one second light emitting diode in the case of parallel connection, wherein the current matching circuit comprises a current mirror circuit comprising a first and a second current mirror transistor, wherein the first current mirror transistor is connected via its collector terminal to the at least one first light emitting diode and the second current mirror transistor is connected via its collector terminal to the at least one second light emitting diode, and wherein the switch arrangement is configured to form the series circuit comprising the at least one first light emitting diode and the at least one second light emitting diode whilst bypassing the current matching circuit in such a way that, in the case of series connection, the first current mirror transistor is switched in a high-resistance fashion and the second current mirror transistor is short-circuited.

2. The optoelectronic circuit as claimed in claim 1, wherein the predefined ambient parameter is an ambient parameter that is independent of the optoelectronic circuit.

3. The optoelectronic circuit as claimed in claim 1, wherein the predefined ambient parameter is a temperature.

4. The optoelectronic circuit as claimed in claim 1, wherein the predefined ambient parameter is a temperature-dependent operating voltage and/or a temperature-dependent operating current of the at least one first light emitting diode or of the at least one second light emitting diode.

5. The optoelectronic circuit as claimed in claim 1, wherein the at least one first light emitting diode and/or the at least one second light emitting diode are/is configured as organic light emitting diode.

6. The optoelectronic circuit as claimed in claim 1, wherein the switch arrangement comprises at least one ground-referenced switch.

7. The optoelectronic circuit as claimed in claim 1, wherein the at least one first light emitting diode and the at least one second light emitting diode are formed on a common substrate.

8. An optoelectronic component, comprising an optoelectronic circuit as claimed in claim 1,
   wherein the at least one first light emitting diode and the at least one second light emitting diode comprise a common carrier and a common covering body; and
   wherein the switch arrangement is formed between the common carrier and the common covering body.

9. The optoelectronic component as claimed in claim 8, wherein the current matching circuit is formed between the common carrier and the common covering body.

10. A method for operating an optoelectronic circuit, the optoelectronic circuit comprising:
    at least one first light emitting diode;
    at least one second light emitting diode;
    a switch arrangement, which is connected between the at least one first light emitting diode and the at least one second light emitting diode in such a way and is configured in such a way that it switches over the at least one first light emitting diode and the at least one second light emitting diode between a series circuit formed by them and a parallel circuit formed by them, depending on a predefined ambient parameter; wherein the switch arrangement comprises a diode or a switch for connecting the at least one first light emitting diode in series with the at least one second light emitting diode; and
    a current matching circuit for matching the currents through the at least one first light emitting diode and the at least one second light emitting diode in the case of parallel connection, wherein the current matching circuit comprises a current mirror circuit comprising a first and a second current mirror transistor, wherein the first current mirror transistor is connected via its collector terminal to the at least one first light emitting diode and the second current mirror transistor is connected via its collector terminal to the at least one second light emitting diode; and wherein the switch arrangement is configured to form the series circuit comprising the at least one first light emitting diode and the at least one second light emitting diode whilst bypassing the current matching circuit in such a way that, in the case of series connection, the first current mirror transistor is switched in a high-resistance fashion and the second current mirror transistor is short-circuited; the method comprising:
    determining a predefined ambient parameter; and
    connecting the at least one first light emitting diode in parallel or in series with the at least one second light emitting diode depending on the predefined ambient parameter determined.

11. The method for operating an optoelectronic circuit as claimed in claim 10,
    wherein determining the predefined ambient parameter comprises measuring a temperature and/or measuring a temperature-dependent operating voltage and/or a temperature-dependent operating current of the at least one first light emitting diode or of the at least one second light emitting diode.

* * * * *